(12) United States Patent
Gretz

(10) Patent No.: US 6,752,362 B1
(45) Date of Patent: Jun. 22, 2004

(54) OUTDOOR GARDEN POST

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 203 days.

(21) Appl. No.: 10/112,563

(22) Filed: Mar. 28, 2002

Related U.S. Application Data

(63) Continuation-in-part of application No. 09/860,064, filed on May 17, 2001.

(51) Int. Cl.⁷ .............................................. F21V 15/00
(52) U.S. Cl. ..................... 248/156; 248/530; 248/545
(58) Field of Search ................................. 248/156, 530, 248/87, 85, 545; 362/431

(56) References Cited

U.S. PATENT DOCUMENTS

| | | | | |
|---|---|---|---|---|
| 3,011,598 A | * | 12/1961 | Galloway et al. | 189/30 |
| 3,831,891 A | * | 8/1974 | Jester | 248/44 |
| 4,507,715 A | * | 3/1985 | Wedding | 362/153 |
| 4,519,657 A | * | 5/1985 | Jensen | 339/15 |
| 4,785,376 A | * | 11/1988 | Dively | 361/334 |
| 4,858,877 A | * | 8/1989 | Carter | 248/545 |
| 4,914,258 A | * | 4/1990 | Jackson | 174/45 R |
| 5,255,810 A | * | 10/1993 | Hosford | 220/243 |
| 5,586,742 A | * | 12/1996 | Carter | 248/545 |
| 5,641,939 A | * | 6/1997 | Tourigny | 174/45 R |
| 5,820,255 A | * | 10/1998 | Carrington et al. | 362/431 |
| 6,054,005 A | * | 4/2000 | Hurley et al. | 174/66 |
| D424,524 S | * | 5/2000 | Guercio | D13/154 |
| D430,942 S | * | 9/2000 | Schuster | D25/126 |
| 6,303,863 B1 | * | 10/2001 | Raasch | 174/66 |
| 6,460,951 B1 | * | 10/2002 | Baxter et al. | 312/257.1 |

* cited by examiner

Primary Examiner—Leslie A. Braun
Assistant Examiner—Steven Marsh

(57) ABSTRACT

An apparatus for mounting and supporting fixtures and electrical devices in an outdoor setting. The apparatus includes an elongated body having side walls and a closed top. The top of the body includes an aperture and an electrically conductive bushing leading into a junction box that meets electrical codes. Integral radial projections extend from the lower portion of the elongated body for anchoring the apparatus to the ground. A wide cable entryway is provided in the lower portion to accept electrical feed cables. The cables are pulled into the junction box and the lower portion of the body buried in the ground. A fixture may be mounted to the bushing and an electrical device mounted in the junction box. After wiring connections are completed within the box and a cover or face plate inserted over the electrical device, the apparatus provides a stable, weatherproof platform for mounting fixtures and electrical devices in an outdoor setting.

4 Claims, 6 Drawing Sheets

US 6,752,362 B1

OUTDOOR GARDEN POST

This application is a Continuation-In-Part of U.S. patent application Ser. No. 09/860,064 entitled "Landscape Fixture Support Post", filed May 17, 2001 and still pending.

FIELD OF THE INVENTION

The present invention relates to the field of outdoor ground-level fixtures and electrical devices, and more particularly to a stable, inexpensive post for supporting fixtures located in a landscape setting outdoors.

BACKGROUND OF THE INVENTION

It is well known to mount various lights outdoors in order to provide illumination and decorative effects to a landscape. Various methods of mounting such lights are known as well, the most popular being a four-flanged spike driven into the ground and a cylindrical post with a slant-cut bottom. However, there still exists in the industry a need to provide mounting devices for lawn or landscape systems that are stable, durable, inexpensive, and easy to install and maintain and that provide a mounting surface for fixtures combined with a junction box.

U.S. Pat. No. 4,858,877 to Carter discloses a plastic standard for supporting a light fixture adjacent to the ground. It includes a nonconductive plastic pipe with a removable cap and stabilizing plates secured to the outside of the pipe.

U.S. Pat. No. 4,774,648 to Kakuk discloses a low voltage light fixture mounted on an integral stake/post assembly. The hollow post contains the conductors for the light and the post mounts to a flanged stake driven into the ground.

U.S. Pat. No. 4,768,139 to Poppenheimer discloses a lighting fixture that is mounted on a stake having a channel-like cross section that contains the conductor.

U.S. Pat. No. 4,519,657 to Jensen discloses a service unit having a hollow body mounted on a supporting surface by a mounting means. The mounting means is typically an integrally base which can be bolted directly to a suitable structure such as a concrete base set in the ground. Mounted within the hollow body are power distribution means, power-metering means, and at least one lighting means.

U.S. Pat. No. 3,435,124 to Channell discloses a pedestal and underground terminals for buried cable systems. An essentially cylindrical housing contains an upper portion that may be pressurized to keep out moisture, etc. The upper portion is mounted to a cylindrical stake with a cut out side to facilitate cable routing and affixation into the earth.

However, each of the systems and apparatuses disclosed above fails to solve the problems addressed by the present invention by providing a mounting device that enables connection of fixtures, provides a junction box for connection of electrical devices, and is constructed of a unitary body having easy access for connection of wiring, maintenance, and inspection.

OBJECTS OF THE INVENTION

Thus, it is an object of the present invention to provide an inexpensive, weatherproof enclosure for mounting fixtures upon the ground in a landscape setting.

It is another object to provide an enclosure that is easily secured in the ground.

It is another object to provide an enclosure that includes an Underwriters Labs (UL) listed box within the enclosure for easy mounting of electrical devices such as electrical receptacles.

It is also an object of the present invention to provide a simple device for providing electrical services in a garden setting.

It is a further object to provide a device to mount both a light fixture and an electrical outlet in one location.

It is yet another object to make the enclosure and the ground securing device integral as one piece.

It is another object of the present invention to provide a stable, durable system for mounting electrical devices close to the ground.

It is yet a further object of the present invention to provide a mounting system for external systems that is easily maintained and accessed after installation.

It is indeed a further object to provide a mounting system with a minimum of separate parts and a primary unitary body structure.

It is a further object of the present invention to provide a mounting system for devices outdoors that is easy and inexpensive to manufacture.

These, and other objects, will become readily apparent to one of skill in the art having regard for this disclosure.

BRIEF DESCRIPTION OF THE INVENTION

To accomplish the above objects and to solve the long felt need for a weatherproof, inexpensive, easily accessible mounting system, the applicant has devised a novel landscape fixture and outlet support post. The top of the post may be used for mounting devices that are typically exposed to the landscape surroundings such as lights, cameras, photocells to control lighting, and other similar devices. A UL-listed electrical box is provided within the enclosure for housing electrical receptacles, switches, ground fault circuit interrupters ("GFCI's") or any such similar devices that typically are secured within a UL-listed box.

The post in a preferred embodiment includes a basically elongated body of square cross section having a top and a bottom end. The top end includes an aperture through which various devices may be mounted or connected and the bottom end is tapered to provide an open pathway for running electrical cables into the enclosure. The body is essentially hollow but with a portion closed off to provide a UL-listed electrical outlet box. The outlet box is accessible from one side of the post by a service portal. The service portal is provided with a removable cover that is secured thereto. The elongated body includes integral radial projections that serve to stabilize and anchor the body in the ground.

REFERENCE NUMERALS USED IN THE SPECIFICATION AND DRAWINGS

10—outdoor garden post
12—elongated body
14—side wall
16—upper portion
18—middle portion
20—lower portion
22—closed top
24—radial projections
26—shelf
28—opening
30—aperture
32—cover
34—gasket
36—upper boss (in body)
38—lower boss (in body)
40—inner apertures
42—outer apertures
44—bushing
46—lower end (of bushing)
48—top wall
50—nut
52—bushing gasket
54—grounding lug
56—junction box
58—inner end (of shelf)
60—outer end (of shelf)
62—thin-walled areas
64—knockout
66—lip (on shelf)
68—boss (on shelf)
69—coaxial apertures
70—gap
71—self-tapping screws (for shelf)
72—grounding wire
74—spike
76—entryway
78—ground level
80—light fixture
82—GFCI
83—alternate embodiment of outdoor garden post
84—grounding plate
86—screw
88—anchoring holes

DETAILED DESCRIPTION

As this invention may be more easily explained by reference to the attached drawings, it should be noted that the figures are representative and exemplary of the invention only, and should not be construed as limiting the scope of the invention in any way.

The invention, an electrical service apparatus that may be termed an outdoor garden post, is suitable for a wide range of fixtures and electrical devices which may be mounted in a landscape. Such fixtures and electrical devices include, but are not limited to, lighting fixtures, sensors such as rain gauges, light sensors, motion sensors, and infrared sensors, cameras, microphones, receptacles, switches, ground fault circuit interrupt (GFCI) receptacles, and vibration detectors. A stable and easily serviceable mounting platform is critical for many applications, and the present invention provides such a platform that is also inexpensive and weather resistant.

Figure 1:
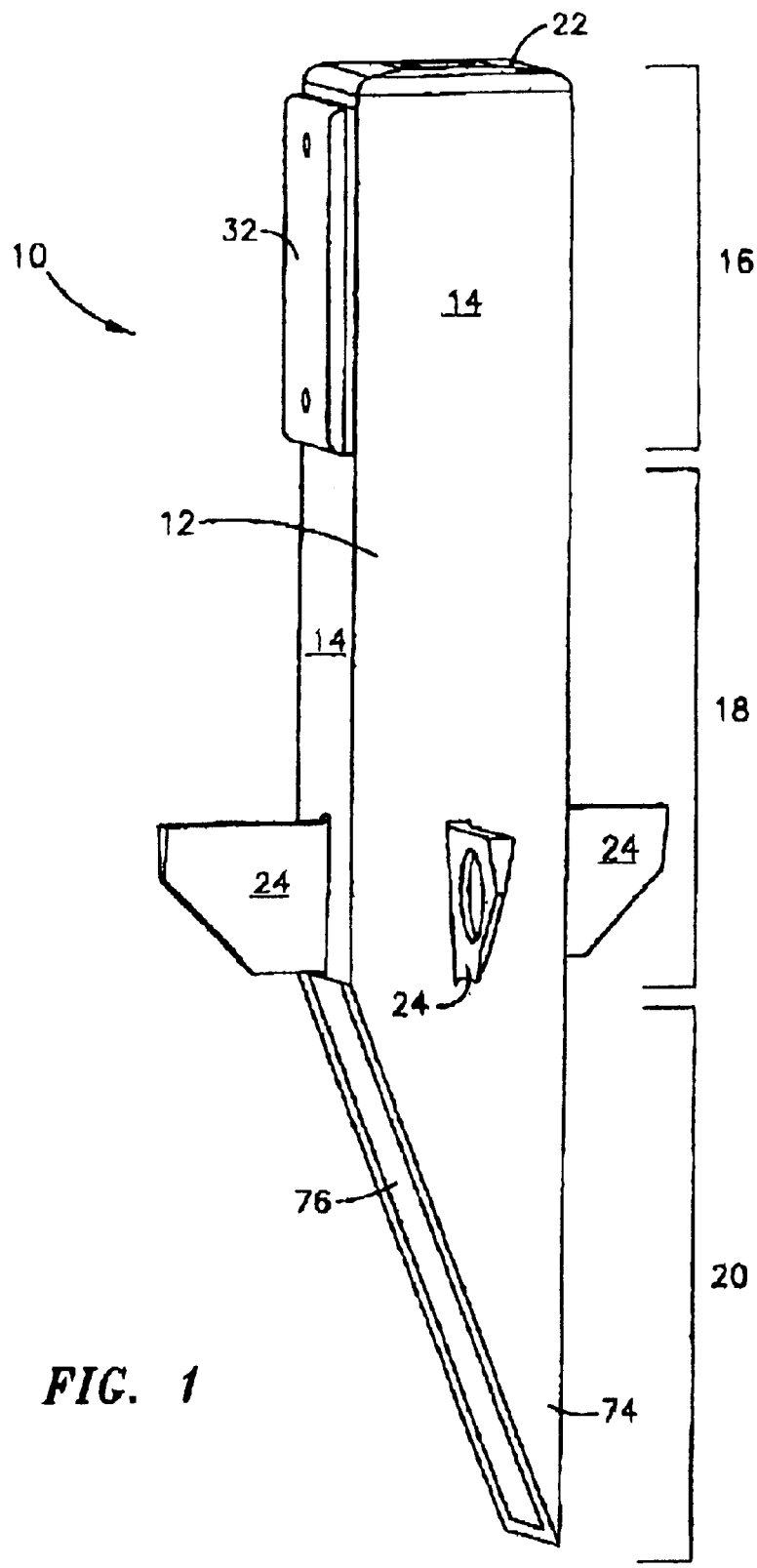
FIG. 1 is a perspective view of a preferred embodiment of the outdoor garden post of the present invention.

Turning now more specifically to FIG. 1, an outdoor garden post 10 according to the present invention is shown. The preferred embodiment of the garden post 10 has an elongated body 12 of square cross section. The body is typically rigid and formed in an injection molding process in one piece and with a sufficient wall thickness to support the fixture and make it sturdy enough to resist lawn mowers or similar equipment when mounted in the ground. A presently preferred material for forming the body is plastic such as polyvinyl chloride, polycarbonate, or polyethylene. Other materials may be used for construction of the body as well, such as metal. Preferably, the four side walls 14 are from 0.1 to 0.5 inch thick. A preferred embodiment formed of polycarbonate or polyvinyl chloride is more preferably 0.15 to 0.25 inch thick. It is desired to keep the wall thickness as thin as possible while still providing the proper strength and rigidity for the elongated body 12, as the device will be less expensive to produce. By providing a unitary body and a cover produced by an injection molding process, the elongated body does not exhibit discoloration from chipping. Therefore, the body and cover have the advantage of not showing chips and dents from accidental bumps by lawn mowers, yard tools, and the like.

As shown in FIG. 1, the elongated body 12 includes an upper 16, middle 18, and lower portion 20 and a closed top 22. A plurality of radial projections 24 extend from one or more of the side walls 14.

Figure 2:
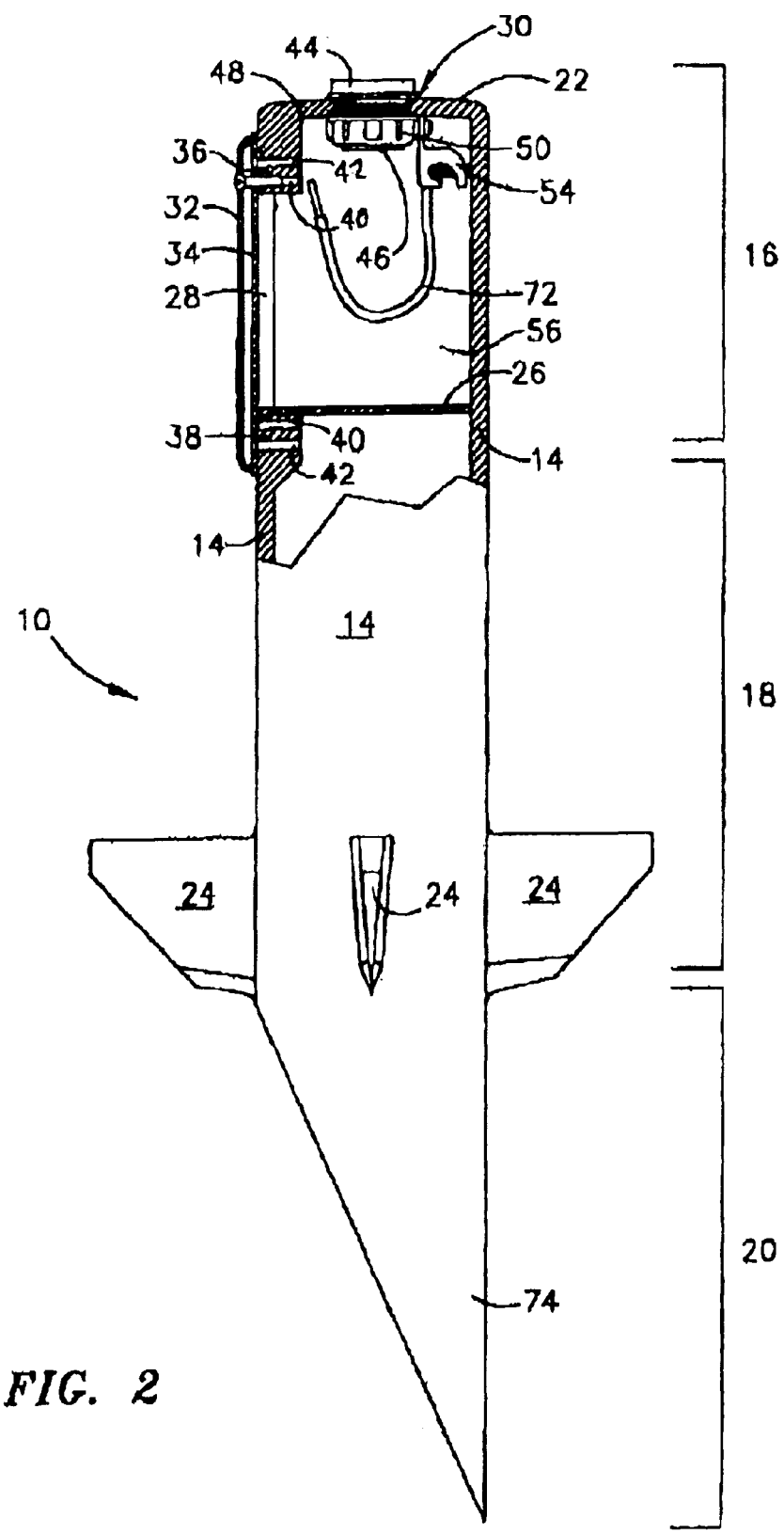
FIG. 2 is a side view of the outdoor garden post of FIG. 1 with part of the center portion wall removed to expose the UL-listed box.

Referring to FIG. 2, a side view of the outdoor garden post 10 with a portion of the side wall 14 broken away, a shelf 26 is shown extending from an opening 28 in the upper portion 16. The elongated body 12 of the outdoor garden post 10 is typically molded in one piece, with the radial projections 24 integral with the body 12. The opening 28 in the upper portion 16 is typically formed in the molding operation as is an aperture 30 in the top 22. The garden post is typically provided with a cover 32 and a gasket 34 sandwiched between the cover 32 and the side wall 14 at the opening 28. Two thick wall portions are provided in the elongated body to create an upper boss 36 and a lower boss 38 which include inner 40 and outer 42 apertures. The inner 40 and outer 42 apertures may be threaded to accept standard threaded screws that are provided with wall mounted electrical fixtures or may be unthreaded to accept self-tapping screws.

The top aperture 30 is typically provided with a bushing 44 threaded interiorly throughout its length. Preferably, the interior threads of the bushing 44 are ½-inch NPT size, which will accept the ½-inch exterior threads that are typically provided on most standard fixtures (not shown). The lower end 46 of the bushing has exterior threads that extend through the top wall 48 and is secured to the top 22 by a correspondingly mated nut 50 on the interior of the hollow body 12. A bushing gasket 52 is typically provided between the bushing 44 and the outer surface of the top wall 48 to make the bushing watertight with the body 12. A grounding lug 54 extends from the nut 50 into a junction box 56 formed by the shelf 26 secured to the elongated body 12.

Figure 5:
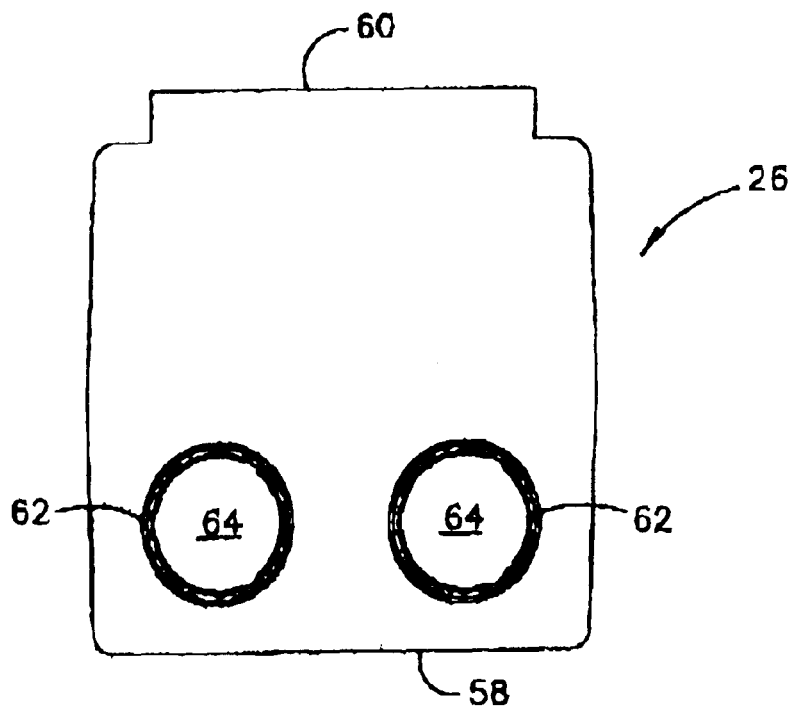
FIG. 5 is a plan view of a shelf used with the preferred embodiment of FIG. 1 to provide an UL-listed electrical box.
Figure 6:
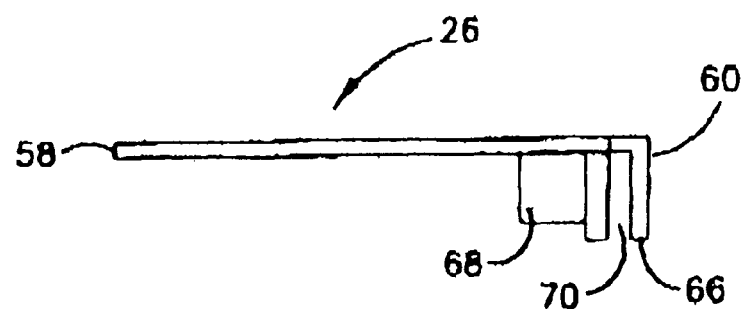
FIG. 6 is a side view of the shelf shown in FIG. 5.
Figure 7:
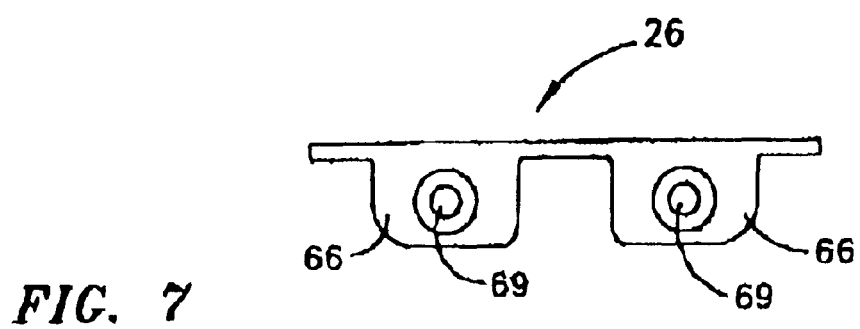
FIG. 7 is a front view of the shelf shown in FIG. 5.

Referring to FIG. 5, the shelf 26 has an inner 58 and outer 60 end. Thin walled areas 62 are provided in the shelf 26 to provide wiring knockouts 64. The side view of the shelf 26 in FIG. 6 depicts the outer end 60 with a lip 66 and a boss 68. As shown in FIG. 7, a view of the shelf 26 from the right side of FIG. 6, two lips 66 are preferred along with their bosses (not shown). Coaxial apertures 69 are provided in the lips 66 and bosses 68 to accept affixation devices. The gap 70 between the lips 66 and bosses, as shown in FIG. 6, is slightly larger than the wall thickness of the elongated body (not shown).

Figure 8:
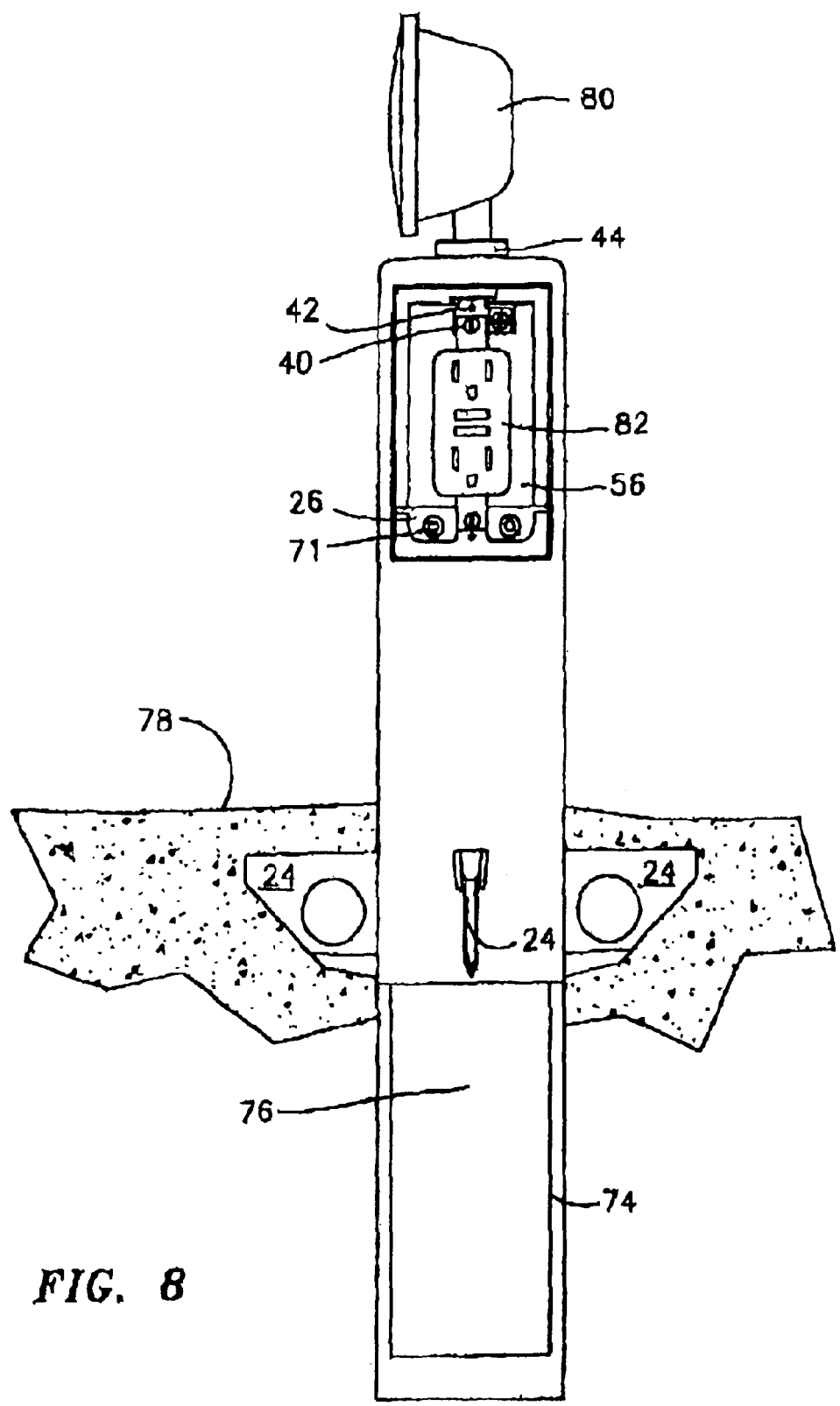
FIG. 8 is a front view of the outdoor garden post of FIG. 1 including a GFCI receptacle installed in the electrical junction box and a light fixture secured to the top of the post.

Referring now to FIG. 2, the shelf 26 is secured to the elongated body 12 by first lifting it into the opening 28 and then dropping it downward until the lips and bosses (not shown) of the shelf 26 bracket the lower wall of the body 12 at the lower end of the opening. Affixation devices, typically self-tapping screws 71, shown in FIG. 8, are then placed through the apertures in the lip and screwed into the apertures in the shelf bosses until tight, whereupon the shelf forms a wall across the open area within the hollow body 12. The shelf 26, secured in the location shown in FIG. 2, therefore forms an enclosed volume that is a UL-listed junction box 56 in the upper portion 16 of the elongated body 12. The junction box 56 includes a grounding wire 72 extending from the grounding lug 54 and a plurality of knockouts (not shown).

Referring to FIG. 1, the lower portion 20 of the outdoor garden post 10 is formed into a spike 74 formed by removing the side walls along an angled plane. The preferred angle of the plane with respect to the side walls 14 is approximately 25 degrees, but may acceptably be between 20 and 40 degrees. This forms a large entryway 76 for the passage of cables (not shown) into the post. This large cable entryway 76 makes it very convenient to lead an underground electrical feed into the post 10, as the large opening is typically 3.0 inches wide by 7.5 inches long. If the post 10 is buried a foot in the ground, cables buried from 5 inches to 12 inches deep will line up with the opening, making it easy and convenient to lead cables (not shown) into the entryway 76. Referring again to FIG. 2, the overall dimensions of the outdoor garden post 10 are preferably 3.312 inches in width when measured across the outer faces of the side walls 14 and 19.5 inches in length from the exterior of the top 22 to the end of the spike 74. Acceptable dimensions however for the post 10 are 2.8 to 4.5 inches width by 15 to 45 inches long. Even longer posts can be constructed but the length of the lower portion 20, especially below the radial projections 24 would likely be increased to provide secure anchoring for the longer upper 16 and middle 18 portions. On the preferred embodiment of the post 10, the location of the radial projections 24 is not critical, as long as they are below the ground level after burial, are preferably located approximately 9.25 inches from the end of the spike 74. The bottom of the shelf 26 that forms the junction box 56 is typically 14.5 inches from the lower end of the spike 74 in the preferred embodiment, therefore permitting burial of the preferred embodiment of the post 10 to a depth of between 9.3 and 14.0 inches. Burial depth is not critical as long as it is deep enough to cover the radial projections 24 and shallow enough to keep the UL-listed junction box 56 sufficiently above ground level to avoid any anticipated standing or runoff water.

For the preferred embodiment of the outdoor garden post 10 according to the present invention, the junction box 56 typically measures 2.8 inches across by 3.9 inches long by 2.8 inches deep. These dimensions provide a junction box that contains enough volume to accommodate any typical box mounted electrical device, including GFCI wiring devices. Sufficient clearance is provided around the GFCI device and at least 2.0 inches depth behind it for accommodating the wiring connections. The opening 28 leading into the junction box 56 is typically 2.2 inches across by 3.3 inches long, also sized to accommodate a GFCI device or any typical electrical device.

Figure 4:
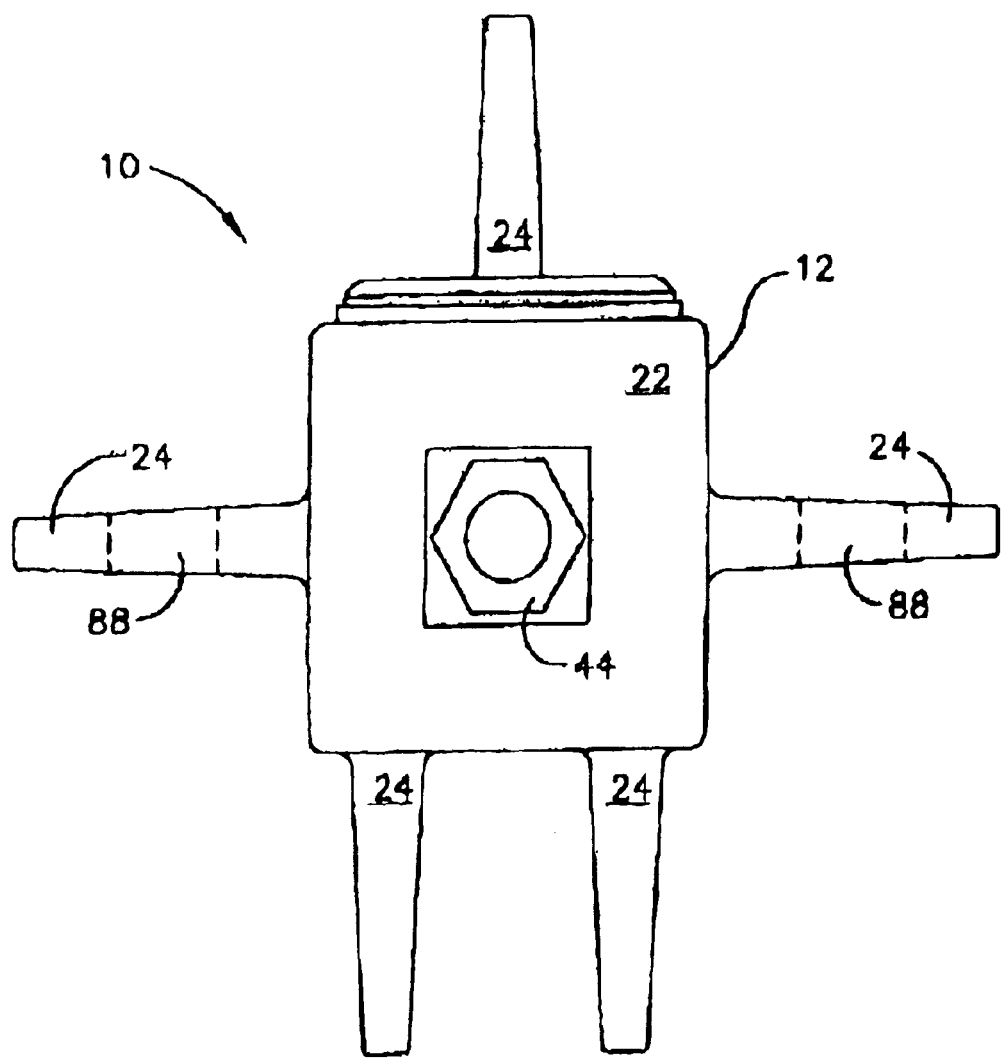
FIG. 4 is a top view of the outdoor garden post of FIG. 1.

FIG. 4 is a top view of the elongated body 12 that shows the preferred arrangement of the radial projections 24 when 5 projections are provided for stabilizing the post 10 in the ground. The post can be provided with 4, or 3 or even 2 radial projections 24 and rebar (not shown) or similar construction material may be run through anchoring holes 88 (indicated by dashed lines) provided in the projections 24 to further anchor the body 12. Although FIG. 4 shows anchoring holes 88 in two of the five radial projections 24, the anchoring holes 88 could be provided in each of the projections if desired.

To place the outdoor garden post in operation, a hole is first dug in the ground. Referring to FIG. 8, the elongated body is typically buried to a depth indicated by the ground level 78 as indicated. The outdoor garden post may be used to mount a fixture, such as the light fixture 80 shown in FIG. 8, or other fixtures such as a photocell, camera, motion detector, or similar electric fixtures desired in an outdoor setting. An electrical device may also be mounted within the junction box such as the GFCI receptacle 82 shown in FIG. 8. Any other electrical device that may be used in a UL-listed junction box, such as a standard 3 prong duplex receptacle, a 3 prong duplex receptacle with a cover, a GFCI with a cover, a switch, a telephone jack, or any of a number of other electrical devices may be mounted within the box at the location occupied by the GFCI in FIG. 8.

A cap (not shown) is provided with the outdoor garden post to close off and weatherproof the top bushing in those instances in which a user prefers to use the post for an electrical device mounted in the junction box but does not intend to attach a fixture to the top bushing. The cap is simply threaded exteriorly and threads into the female threads of the bushing.

The outdoor electrical post is designed and constructed to accept line voltage, or 120 volt power, and devices and fixtures requiring line voltage. However, it also may easily be used for low-voltage lights and fixtures if preferred.

Suitable gasket materials may be any of the commonly available flexible waterproof materials, such as rubber (natural or synthetic), Neoprene™, Santoprene™, or other flexible resilient deformable plastic materials.

Although the preferred embodiment is shown having a square cross-section and therefore four flat walls in this disclosure, it should be noted that the number of flat walls may be varied by one of skill in the art having regard for this disclosure to form any of a number of geometric cross-sections, such as a rectangle, parallelogram, trapezoid, pentagon, hexagon, octagon, and others without departing from the scope of the invention.

Figure 3:
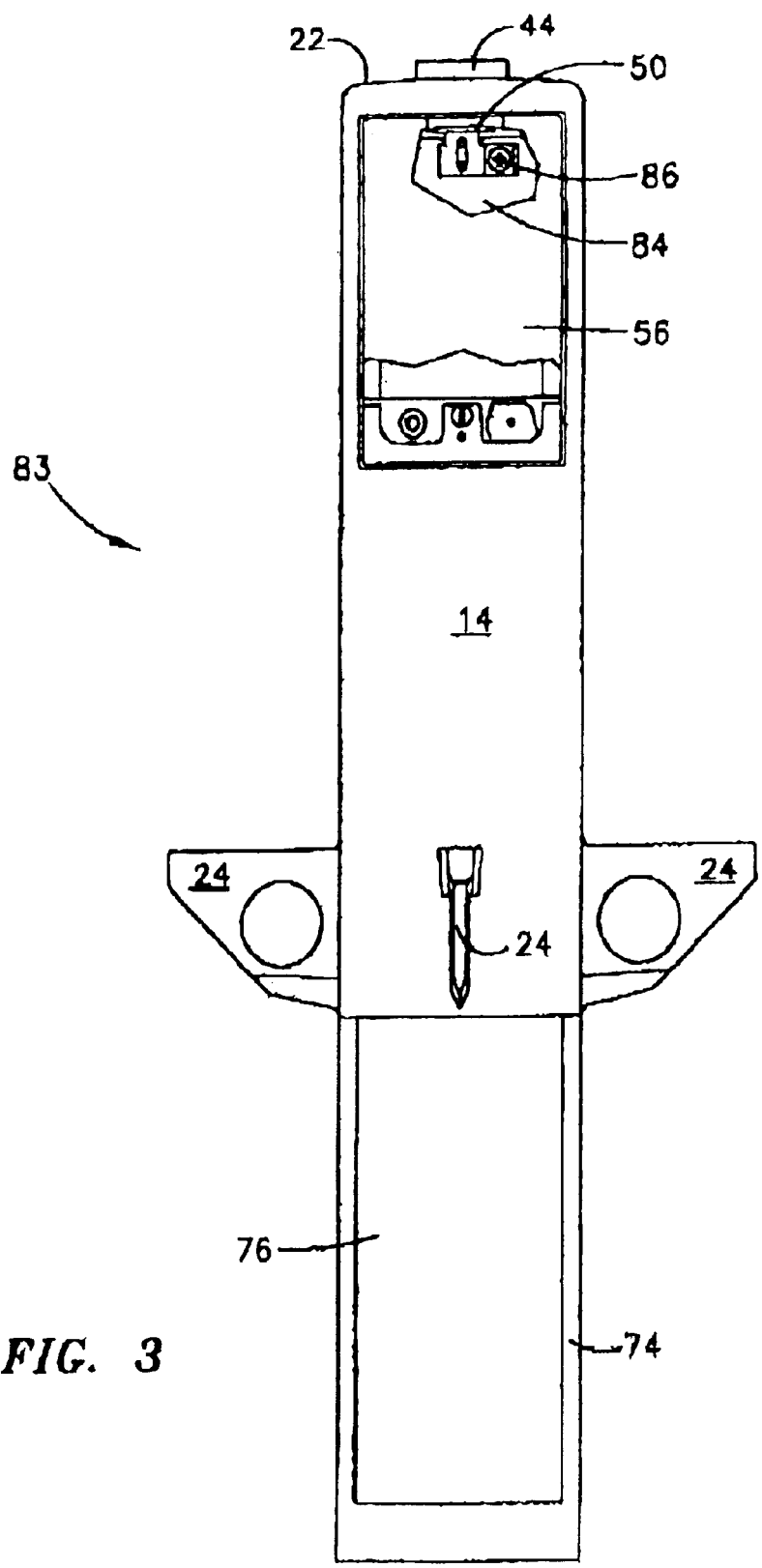
FIG. 3 is a front view of an alternate embodiment of the invention including a grounding plate.

FIG. 3 shows an alternate embodiment 83 with a grounding plate 84 as is required by the electrical code in Canada. The grounding plate 84 is typically secured to the nut 50 by a screw 86. As the bushing 44, nut 50, and grounding plate 84 are all electrically conductive and interconnected, the grounding plate may be easily grounded by connecting the ground wire of the feed cable to the plate 84, assuming the ground wire of the feed is properly grounded on the opposite end.

While the invention has been described by reference to the preferred embodiment disclosed herein, the invention is subject to considerable modification and may be tailored to fit the needs of many suitable mounting needs without departing from the scope or spirit of the claims which are appended hereto.

What is claimed is:

1. An electrical service apparatus comprising:

a rigid hollow elongated body having side walls and a closed top;

said body including an upper, middle, and lower portion;

an opening formed in said side walls of said upper portion;

a separate shelf inserted into and secured to one or more of said side walls to close said hollow body at the lower end of said opening;

an electrical junction box at said opening formed by said side walls, said closed top, and said shelf;

said electrical junction box having secured thereto an electrical device with an associated faceplate;

a plurality of integral projections extending from one or more of said side walls of said middle portion;

one or more sections formed in said shelf to enable easy knockout of said sections as desired for passage of cables;

one or more bosses integral with said side walls at the periphery of said opening;

apertures in each of said bosses, said apertures capable of accepting fasteners of said electrical device; and a removable cover secured across said opening wherein said lower portion of said elongated body may be buried in the ground, electrical supply fed into said junction box, wiring leads completed between said electrical device and said supply, said fasteners fastened into said apertures to secure said electrical device within said junction box, and said faceplate secured to said electrical device to provide said electrical device in an outdoor location.

2. The electrical service apparatus of claim 1 wherein said closed top includes an electrically conductive bushing having a bottom disposed within said electrical junction box; and said bushing threaded internally to accept an electrical fixture whereby said fixture may be secured to said bushing by rotation therein and wiring from said supply to said fixture completed and contained completely within said junction box.

3. The electrical service apparatus of claim 2 wherein said lower portion is formed into a spike formed by removing the wall along an angled plane.

4. The electrical service apparatus of claim 1 wherein said electrical junction box is of a size to accept standard ground fault circuit interrupter devices.

* * * * *